US006307887B1

(12) United States Patent
Gabriel

(10) Patent No.: US 6,307,887 B1
(45) Date of Patent: Oct. 23, 2001

(54) VIDEO ENCODER AND DECODER USING BILINEAR MOTION COMPENSATION AND LAPPED ORTHOGONAL TRANSFORMS

(75) Inventor: Steven A. Gabriel, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/583,214

(22) Filed: May 30, 2000

Related U.S. Application Data

(63) Continuation of application No. 09/429,321, filed on Oct. 26, 1999, now abandoned, which is a continuation of application No. 08/820,503, filed on Apr. 4, 1997, now Pat. No. 5,973,755.

(51) Int. Cl.[7] ....................................................... H04N 7/12
(52) U.S. Cl. ....................................... 375/240.16; 348/699
(58) Field of Search .......................... 375/240.16, 240.17, 375/240.24; 348/416.1, 699; 382/236, 238; 386/111; 358/261.2, 428, 430

(56) References Cited

U.S. PATENT DOCUMENTS

| | | | |
|---|---|---|---|
| 5,008,746 | * 4/1991 | Bernard et al. ...................... | 348/389 |
| 5,157,481 | 10/1992 | Kashimura et al. .................. | 348/263 |
| 5,218,435 | 6/1993 | Lim et al. ........................ | 375/240.16 |
| 5,361,105 | 11/1994 | Lu ........................................ | 348/699 |
| 5,446,495 | 8/1995 | Tourtier et al. .................... | 348/398.1 |
| 5,477,272 | 12/1995 | Zhang et al. .......................... | 348/699 |
| 5,485,210 | 1/1996 | Lim et al. ........................ | 375/240.16 |
| 5,486,876 | * 1/1996 | Lew et al. .............................. | 348/719 |
| 5,600,731 | 2/1997 | Sezan et al. .......................... | 382/107 |
| 5,646,691 | 7/1997 | Yokoyama ............................ | 348/416 |
| 5,682,205 | 10/1997 | Sezan et al. .......................... | 348/452 |
| 5,684,538 | 11/1997 | Nakaya et al. ..................... | 348/416.8 |
| 5,696,848 | * 12/1997 | Patti et al. ............................ | 382/254 |
| 5,701,163 | 12/1997 | Richards et al. ...................... | 348/578 |
| 5,751,364 | 5/1998 | Yasuda et al. ..................... | 348/416.1 |
| 5,844,616 | 12/1998 | Collet et al. ..................... | 375/240.25 |
| 5,886,742 | 3/1999 | Hibi et al. ......................... | 375/240.16 |
| 5,963,259 | 10/1999 | Nakaya et al. ....................... | 348/699 |
| 5,973,755 | * 10/1999 | Gabriel ................................ | 348/699 |
| 6,040,864 | * 3/2000 | Etoh ..................................... | 348/416 |
| 6,046,773 | * 4/2000 | Martens et al. ....................... | 348/384 |

OTHER PUBLICATIONS

Shah et al., "Resolution enhancement of color video sequences", IEEE Transactions on Image Processing, Jun. 1999, vol. 8, Issue 6, pp. 879–885.*

Lu, "Comparison of Motion Compensation Using Different Degrees of Sub–Pixel Accuracy for Interfield/Interframe Hybrid Coding of HDTV Image Sequences," Panasonic Advanced TV–Video Laboratories, Inc., *IEEE*, pp. III–465–468 (1992).

Schulz et al., "Extraction of High–Resolution Frames from Video Sequences," *IEEE Transactions on Image Processing*, vol. 5, No. 6, pp. 996–1011 (Jun. 1996).

* cited by examiner

*Primary Examiner*—Vu Le
(74) *Attorney, Agent, or Firm*—Michalik & Wylie, PLLC

(57) ABSTRACT

A method and system for improved motion compensation between a previous frame of video information and a new frame. Each block of pixels in a block-based compression scheme uses four vectors, three from proximate blocks, to determine motion-induced changes to its pixels. The vectors are interpolated for each pixel based on the location of the pixel in the block with respect to the vectors. The address of each pixel in the frame block of the previous frame is altered based on the resultant vector determined therefor, whereby a color value for the new pixel is obtained from the altered address. Sharp contrasts at the edges between blocks are eliminated due to the gradual blending obtained by using vectors of the adjacent blocks to determine a pixel's color.

22 Claims, 7 Drawing Sheets

VIDEO ENCODER AND DECODER USING BILINEAR MOTION COMPENSATION AND LAPPED ORTHOGONAL TRANSFORMS

CROSS-REFERENCE TO RELATED APPLICATION

This application is a continuation of U.S. Pat. application Ser. No. 09/429,321, filed Oct. 26, 1999, now abandon which is a continuation of U.S. patent application Ser. No. 08/820,503, filed Apr. 4, 1997, which is now U.S. Pat. No. 5,973,755, issued Oct. 26, 1999.

FIELD OF THE INVENTION

The invention relates generally to the encoding and decoding of video signals, and more particularly to an improved method and system for encoding and decoding video signals using bilinear motion compensation and lapped orthogonal transforms in a layered video compression system.

BACKGROUND OF THE INVENTION

Because of the massive amounts of data inherent in digital video, the transmission of full-motion, high-definition digital video signals is a significant problem in the development of high-definition television. More particularly, each digital image frame is a still image formed from an array of pixels according to the display resolution of a particular system. As a result, the amounts of raw digital information included in high-resolution video sequences are massive. The present technology is incapable of storing and transmitting these amounts of raw video information at a cost that would make digital television practical. Moreover, bandwidth limitations prohibit sending digital video information in this manner. Consequently, various video compression standards or processes have been established, including MPEG-1, MPEG-2, and H.26X.

In general, video compression techniques utilize similarities between successive image frames to provide interframe compression, in which pixel-based representations of image frames are converted to motion representations. In addition, the conventional video compression techniques utilize similarities within image frames, referred to as spatial or intraframe correlation, to provide intraframe compression in which the motion representations within an image frame are further compressed. Intraframe compression is based upon conventional processes for compressing still images, such as discrete cosine transform (DCT) encoding.

MPEG-2, the most prevalent compression technology, provides interframe compression and intraframe compression based upon square blocks or arrays of pixels in video images. A video image is divided into a plurality of transformation blocks, each block composed of 16×16 pixels. For each transformation block $T_N$ in an image frame N, a search is performed across the image of an immediately preceding image frame N−1 or also a next successive video frame N+1 (i.e., bidirectionally) to identify the most similar respective transformation blocks $T_{N+1}$ or $T_{N-1}$.

Ideally, and with reference to a search of the next successive image frame, the pixels in transformation blocks $T_N$ and $T_{N+1}$ are identical, even if the transformation blocks have different positions in their respective image frames. Under these circumstances, the pixel information in transformation block $T_{N+1}$ is redundant to that in transformation block $T_N$. Compression is achieved by substituting the positional translation between transformation blocks $T_N$ and $T_{N+1}$ for the pixel information in transformation block $T_{N+1}$. A single transsslational vector ($\ddot{A}X,\ddot{A}Y$) is designated for the video information associated with the 256 pixels in transformation block $T_{N+1}$.

In reality, however, the video information (i.e., pixels) in the corresponding transformation blocks $T_N$ and $T_{N+1}$ are rarely identical. The difference between them is designated a transformation block error E, which often is significant. Although it is compressed by a conventional compression process such as discrete cosine transform (DCT) encoding, the transformation block error E is cumbersome and limits the extent (ratio) and the accuracy by which video signals can be compressed.

Large transformation block errors E arise in block-based video compression methods for several reasons. The block-based motion estimation represents only translational motion between successive image frames. The only change between corresponding transformation blocks $T_N$ and $T_{N+1}$ that can be represented are changes in the relative positions of the transformation blocks. A disadvantage of such representations is that full-motion video sequences frequently include complex motions other than translation, such as rotation, magnification and shear. Representing such complex motions with simple translational approximations produces these significant errors.

Another aspect of video displays is that they typically include multiple image features or objects that change or move relative to each other. Objects may be distinct characters, articles, or scenery within a video display. With respect to a scene in a motion picture, for example, each of the characters (i.e., actors) and articles (i.e., props) in the scene could be a different object.

The relative motion between objects in a video sequence is another source of significant transformation block errors E in conventional video compression processes. Due to the regular configuration and size of the Transformation blocks, many or them encompass portions of different objects. Relative motion between the objects during successive image frames can result in extremely low correlation (i.e., high transformation errors E) between corresponding transformation blocks. Similarly, the appearance of portions of objects in successive image frames (e.g., when a character turns) also introduces high transformation errors E.

Conventional video compression methods appear to be inherently limited due to the size of transformation errors E. With the increased demand for digital video display capabilities, improved digital video compression processes are required.

At the same time, it has been shown that by splitting a video signal into a base stream and an enhancement stream, the amount of video data transmitted in a given time can be significantly increased. This technique, known as layered compression, provides a substantial improvement over conventional MPEG-2 transmission. However, even with this technique, MPEG-2 stills suffers from the same basic error problems, i.e., while it functions well for translational motion, more complex motion produces errors which break down the translational model. When the translational model breaks down, which it often does, a significant amount of information must be sent to correct the predictions. If the channel does not possess sufficient room for this information, then the predictions reconstructed at the receiver will be poor, cascading into ever-poorer predictions of subsequent frames. To reset the prediction process, DCT compressed (but still large and lossy data) Intra frames, or I-frames, are sent periodically, but to save on overall data transmission are only sent nominally every half-second. In short, with MPEG-2, the overall picture quality still suffers when complex notion is involved, and is at times unpleasant due to the sharp contrast between block edges.

OBJECTS AND SUMMARY OF THE INVENTION

Accordingly, it is a general object of the present invention to provide a method and system for improving the transmission and reconstruction f compressed video images.

A related object is to provide the method and system in a layered compression architecture.

In accomplishing those objects, it is a related object to provide a method and system as characterized above that substantially reduces the perceived edge boundaries between blocks of pixels in a reconstructed image.

Yet another object is to provide a method and system of the above kind that operates without increasing the amount of motion vector data transmitted while oftentimes reducing the amount of error correction data transmitted.

Briefly, the present invention provides an improved method and system for altering existing image data, such as from one video frame to the next, by employing a bilinear motion compensation system. The blocks of pixel information from a previous frame of blocks is preserved, and a plurality of vectors, preferably four, (three of which are from proximate blocks), are received and associated with each block. As each block is compensated for motion differences, the four vectors are used in a bilinear interpolation operation on each pixel in the block to determine an adjusted address for each pixel. The color values at the adjusted pixel address replace the values at the corresponding pixel address in the next frame.

Other objects and advantages will become apparent from the following detailed description when taken in conjunction with the drawings, in which:

DETAILED DESCRIPTION OF THE PREFERRED EMBODIMENT

Figure 1:
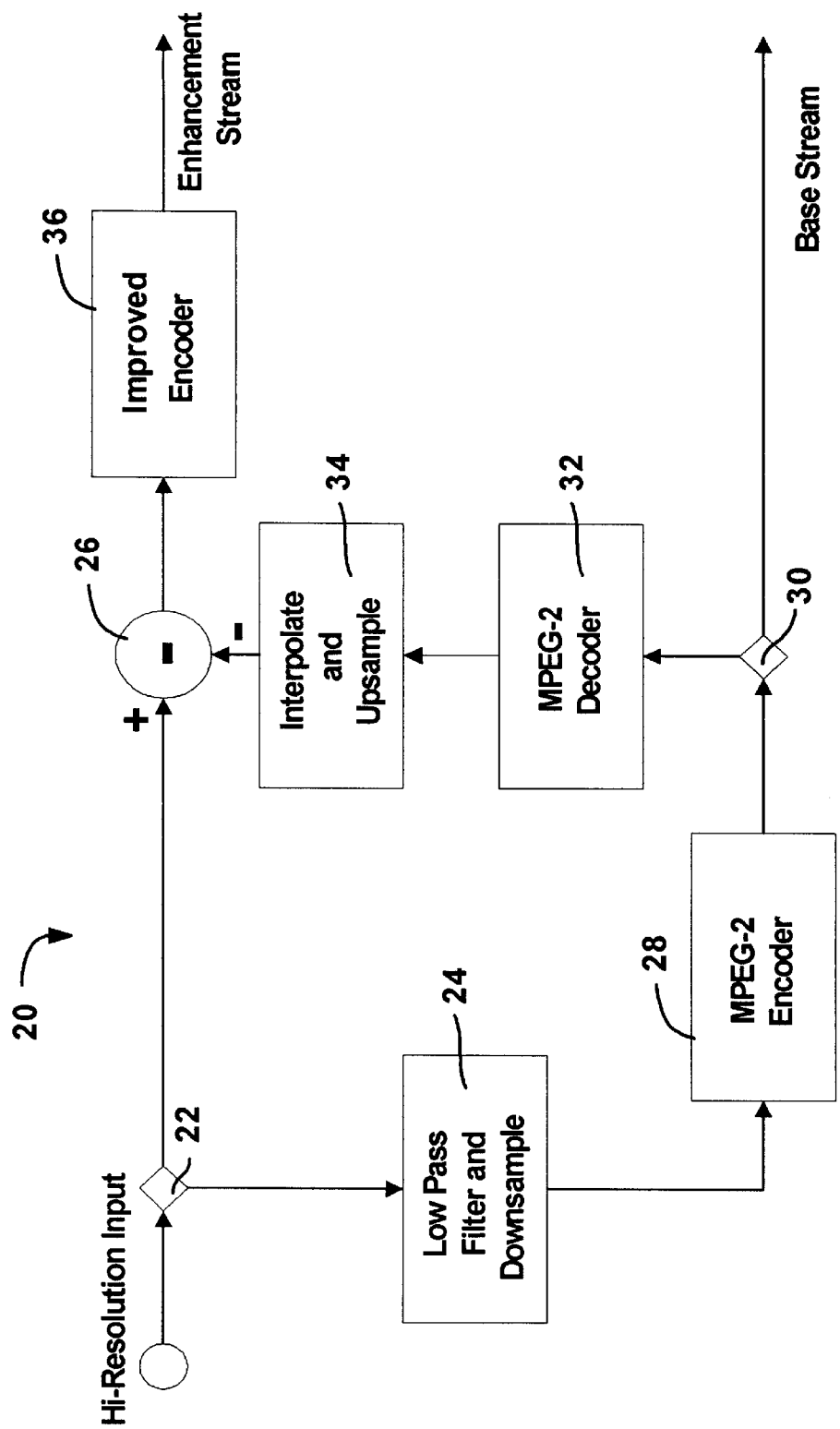
FIG. 1 is a block diagram representing a layered video encoder in which certain aspects of the present invention may be incorporated.

Turning to the drawings and referring first to FIG. 1, there is shown a video encoding system generally designated 20 into which the present invention may be Incorporated. The depicted encoding system 20 accomplishes layered compression, whereby a portion of the channel is used for providing a low resolution base layer and the remaining portion is used for transmitting edge enhancement information, whereby the two signals may be recombined to bring the system up to high-resolution. Accordingly, in FIG. 1, high-resolution video input, e.g., 1920 by 1080 resolution at 60 hertz progressive scanning, is provided from a video source. The system internally develops a low-resolution signal, e.q, 704×430, as described below.

In FIG. 1 the high-resolution video data is split by splitter 22, whereby the data is sent to a low pass filter 24 and a subtraction circuit 26. The low pass filter 24 reduces the resolution of the video data, which is then fed to an MPEG-2 encoder 28. This downconversion block 24 exists only in the encoder system 20 and has a similar layout to the upconversion filters described below with reference to FIGS. 2 and 3. However, because this is an encoder function, longer filters can be used. The H filter is 16 points and the vertical 6 points. In general, low pass filters and MPEG-2 encoders are well known in the art and are not described in detail herein for purposes of simplicity.

In any event, a lower resolution base stream, e.g., 720 by 480 60 hertz progressive, is provided to a second splitter 30 from where it is output from the system 20. The base stream can be broadcast, received and, via an MPEG-2 decoder, (well known in the art), displayed as is, although the base stream does not provide a resolution which would be considered high-definition.

The other output of the second splitter 30 is fed to an MPEG-2 decoder 32 present within the system 20. From there, the decoded signal is fed into an interpolate and upsample circuit 34, described in more detail with reference to FIG. 2 and 3. In general, the interpolate and upsample circuit 34 reconstructs the filtered-out resolution from the decoded video stream and provides a video data stream having the same resolution as the high-resolution input. However, because of the filtering and the losses resulting from the MPEG-2 compression and decompression, certain errors are present in the reconstructed stream. These errors are determined in the subtraction circuit 26 by subtracting the reconstructed high-resolution stream from the original, unmodified high-resolution stream. The output of the subtraction circuit 26 may be fed to an MPEG-2 encoder, providing a reasonable quality enhancement stream. However, as set forth in more detail below, an improved encoder/decoder system 36 according to the present invention provides superior image reconstruction without generally increasing, and potentially significantly decreasing, the amount of enhancement information sent to the receiving end. The enhancement stream is multiplexed with the base data stream using the MPEG-2 data transport mechanism.

Figure 2:
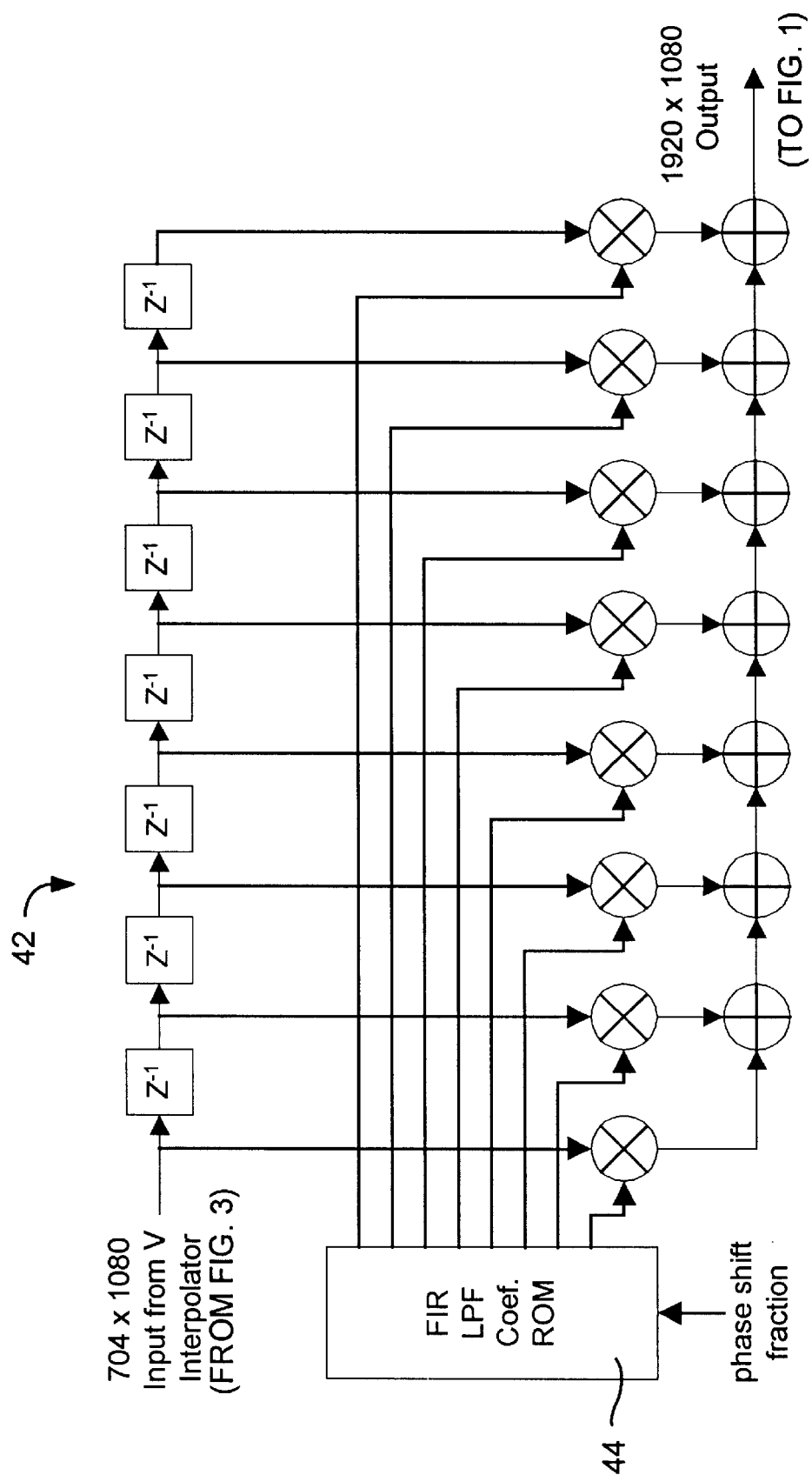
FIG. 2 is a block diagram of a horizontal interpolator used in the layered encoder of FIG. 1.
Figure 3:
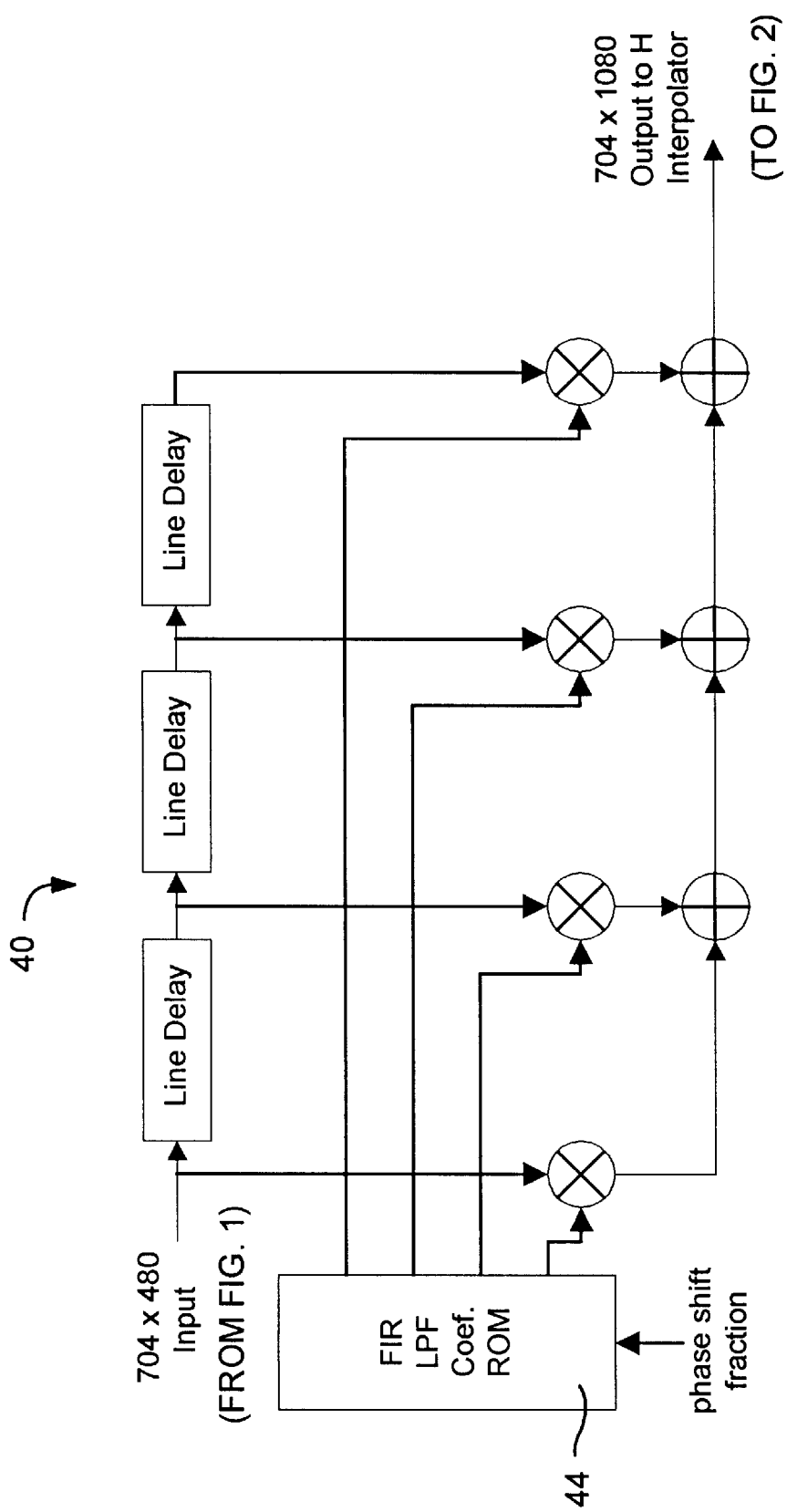
FIG. 3 is a block diagram of a vertical interpolator used in the layered encoder of FIG. 1.

The upconversion function, which is needed in both the encoder and decoder uses high quality multi-point filters which are much better than linear interpolators. As shown in FIGS. 2 and 3, the interpolate and upsample circuit 34 is composed of a 4 point vertical interpolator 40 (FIG. 3) followed by an 8 point horizontal interpolator 42 (FIG. 2). If, for example, the resolution is 1920×1080, the horizontal interpolator 42 outputs points at the 1920 pixel clock rate. Points enter the delay chain at the lower 704 pixel clock rate. The ratio between 1920 and 704 is 30/11, so 30 subpixel phases are needed. Thirty sets of 8 coefficients are stored in the ROM 44. As each new pixel enters the delay chain, either two or three different outputs are calculated depending on the relative phases of the input and output pixel structures. The interpolator has a flat frequency response to about 75% of the 704 pixel Nyquist rate.

The vertical interpolator 40, shown in FIG. 3, is a 4 point interpolator to reduce the number of line delays required. It is placed before the H interpolator to shorten the length of the line delays to 704 pixels. The ratio between 1080 and 480 is 9/4, so 9 subpixel phases are needed. For each new line of input to the interpolator either two or three line outputs are calculated, again depending upon the relative phase of the 480 line structure vs. The 1080 one. The shorter filter four point interpolator is flat to 25% of Nyquist followed by a slow roll-off.

In accordance with one aspect of the present invention, instead of a discrete cosine transform (DCT), in one preferred embodiment the encoder employs a Lapped Orthogonal transform (LOT) to compress the error data for each block. LOTs provide for fast computational algorithms, and, in part because the inverse transforms require consecutive blocks for signal reconstruction, tend to smooth the sharp edges associated with DCTs. A more detailed description of Lapped Orthogonal Transforms may be found in the text entitled *Signal Processing with Lapped Transforms*, H. Malvar, Artech House, Inc. (1992). However, other aspects of the present invention do not depend on any particular compression scheme for the error data, and thus the improved encoder 36 can still provide substantial benefits if DCTs or some other transform is employed.

As with MPEG-2, the improved encoder provides for predicted frames by outputting motion vectors associated with blocks of pixels. To this end, the improved encoder is much like a conventional MPEG-2 encoder. However, as will be discussed in detail below, the decoder ordinarily uses more than one vector to adjust for motion relative to a predicted frame, using interpolation of the multiple vectors. Accordingly, the improved encoder 36 may include a more powerful, interpolation-based motion estimation circuit (search engine) to find the best matched block in the new image with the previous block for which a vector is being generated. However, this is not necessary to the present invention, as an improved decoder 50 (FIG. 4) provides significant benefits with a conventional encoder or improved encoder 36.

In accordance with one aspect of the present invention, the improved decoder 50 of the present invention decodes each of the blocks using bilinear motion compensation. In general, this scheme uses a plurality of motion vectors, including the vectors associated with the blocks containing adjacent pixels, to influence the values of pixels in each given block preserved from the previous (predicted) frame. As a result, the transition between blocks is substantially smoother, as sharp, arbitrary edges common in MPEG-2 compression are reduced or eliminated.

Figure 4:
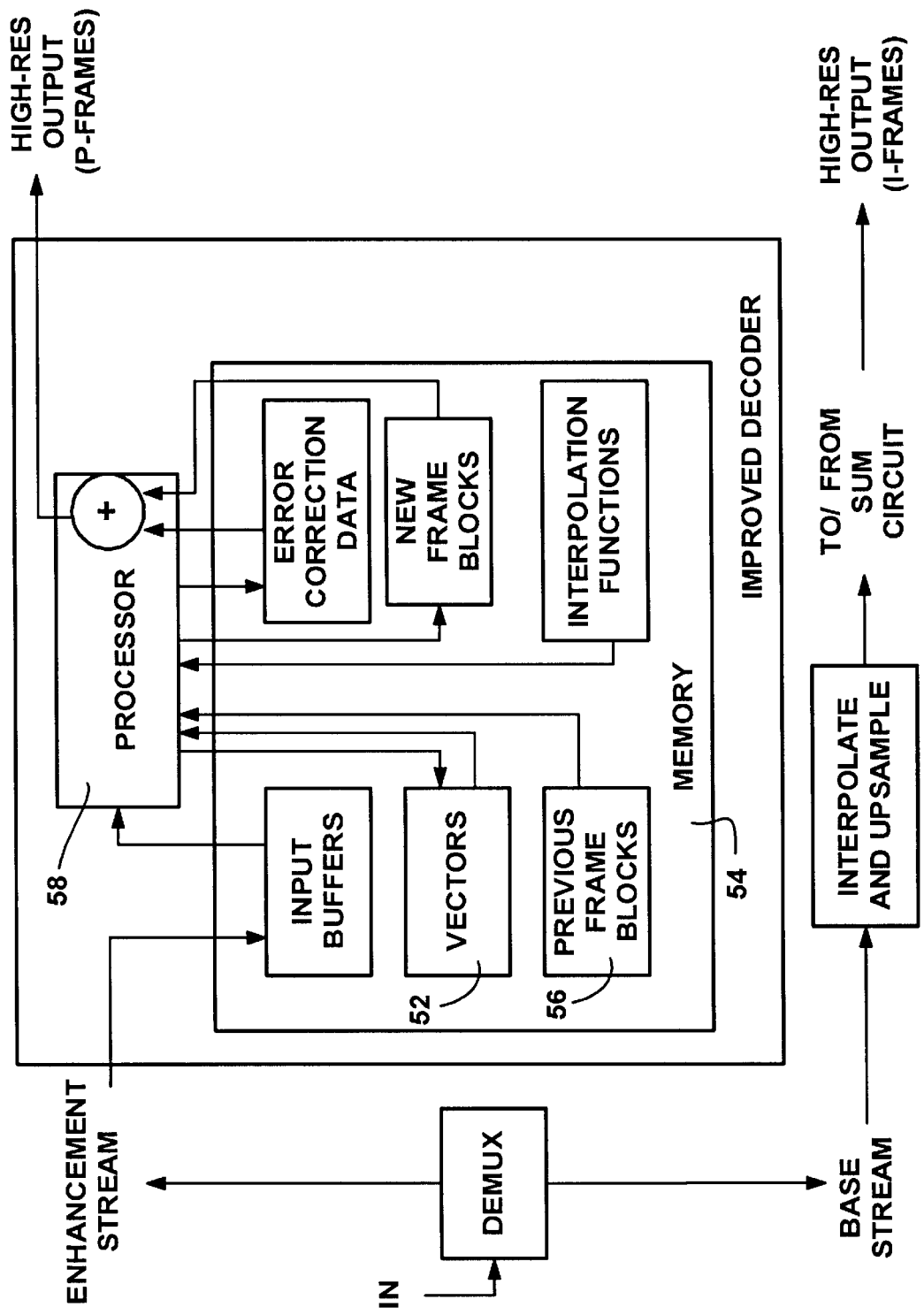
FIG. 4 is a block diagram of a decoder in which certain aspects of the present invention may be incorporated.
Figure 5:
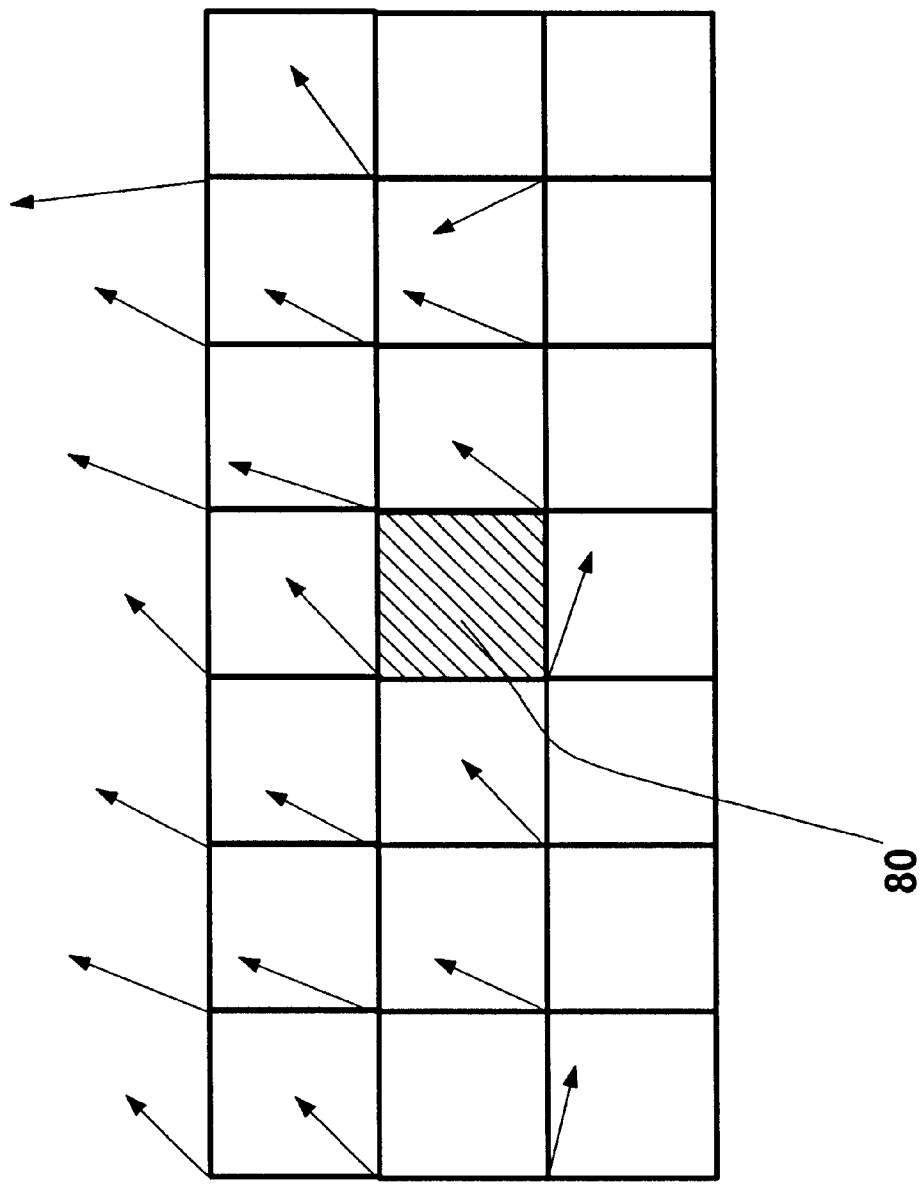
FIG. 5 is a representation of a number of blocks of pixels and vectors associated therewith.
Figure 6:
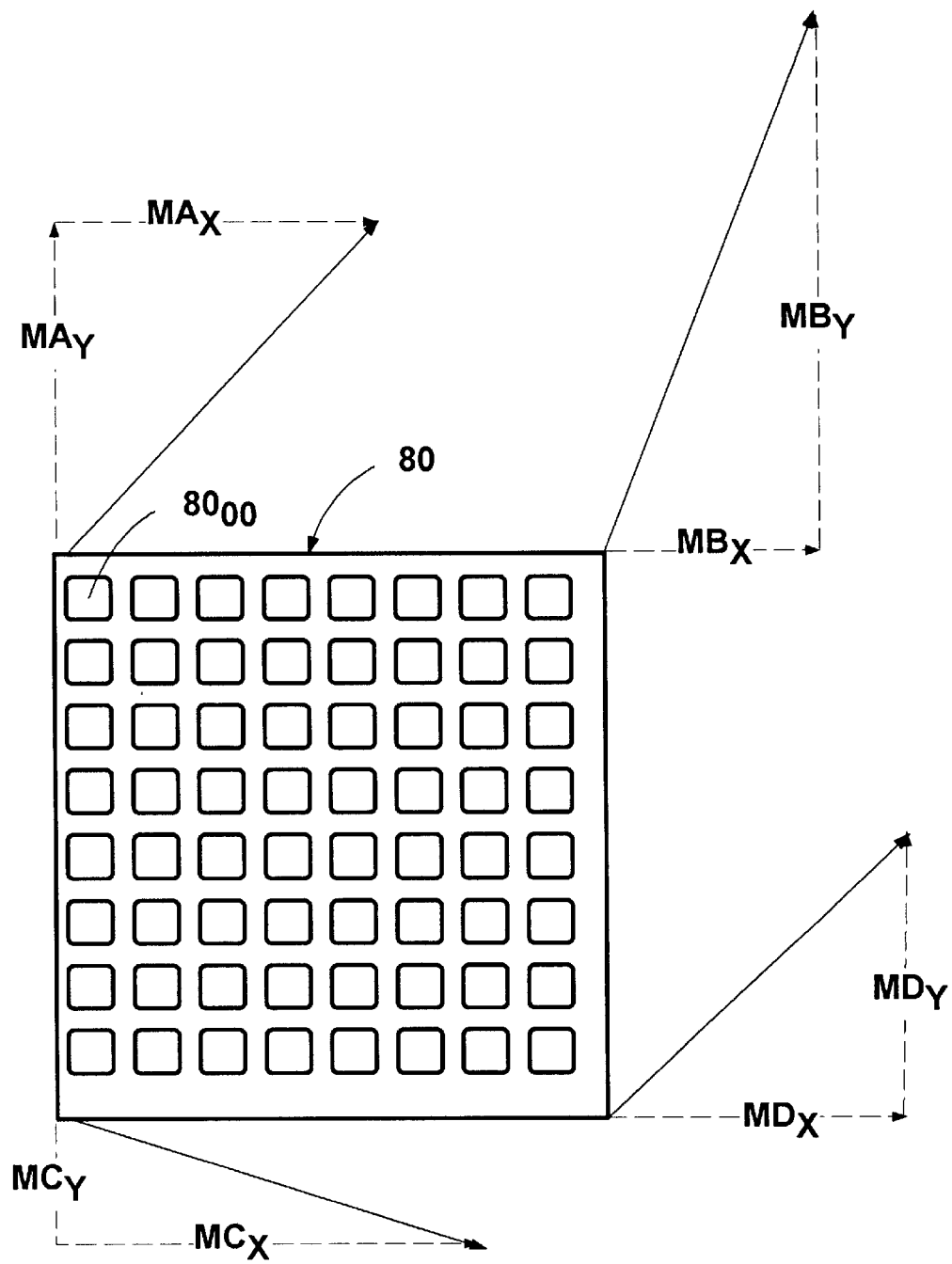
FIG. 6 is a representation of one of the blocks in FIG. 5 showing a number of associated vectors.

To accomplish the bilinear motion compensation, as shown in FIGS. 4 and 5, a number of block vectors are received and stored in a location 52 in the decoder memory 54. Each block corresponds to an m by n array of pixels, typically 16 by 16, but for purposes of simplicity is shown in FIG. 6 as an 8×8 array of pixels. As with MPEG-2, the starting block pixel values are those of the blocks from the previous frame, also stored in memory in location 56. As also with MPEG-2, each of the blocks will receive a motion vector for association therewith, considered for purposes of convenience to be in a block's upper left corner.

However, unlike MPEG-2, the single motion vector associated with a given block is not applied evenly to all pixels in that block, to adjust the addresses thereof to compensate for any motion. Instead, when enough surrounding blocks are received, as shown in FIG. 5, a given block such as the block 80 has four vectors associated therewith, i.e., an upper left (e.g., its own) vector, upper right (right adjacent block's vector), lower left vector (of the block below) and lower right vector (of the block below and to the right). End blocks without other blocks on all sides thereof (e.g., having less than four vectors) are described below.

For example, in FIG. 5, block 80 (shaded for purposes of enhanced visibility herein) has four vectors associated therewith, one in each corner thereof. This block 80 is shown in more detail in FIG. 6, with an 8 by 8 array of pixels visible therein. Note that as with MPEG-2, these pixels are the pixels of the same block in the previous frame. However, unlike MPEG-2, rather than have one vector shift all the pixel addresses in the block, the four associated vectors that were received will individually change the pixel values to compensate for the motion. Note that the same total number of vectors are transmitted in this scheme as with MPEG-2, and indeed can be the vectors transmitted by an MPEG-2 encoder, however four vectors are used together to accomplish motion compensation.

In accordance with one aspect of the invention, bilinear motion compensation is performed on each block by interpolating the four vectors to determine an offset amount of each of the pixels in the block. To this end, the decoder processor 58 takes each of the pixels and determines two vectors for each pixel from the four block vectors using the bilinear formulas:

$$X \text{ vector component} = (1-\beta)MA_x + \alpha(MB_x - MA_x) + \beta(MC_x) + \alpha(MD_x - MC_x)$$

and $$Y \text{ vector component} = (1-\beta)MA_y + \alpha(MB_y - MA_y) + \beta(MC_y) + \alpha(MD_y - MC_y),$$

where $\alpha$ and $\beta$ are the pixel's x and y numbers in the block (e.g., 0–15, 0–15 divided by the total number of pixels in a row and column, respectively (e.g., 16). Such formulas may be stored in the memory at a location 60 therefor. Thus, as is expected with interpolation, the weight of each of the four vectors on a pixel's offset depends on the proximity of the pixel to that vector. For example, the upper left pixel has an $\alpha=0$ and $\beta=0$. The resulting x vector component is simply $MA_x$, the nearest vector x-component thereto. As the selected pixel moves right, the $MB_x$ and $MB_y$ vector components begin to influence the resultant vector more and more for that pixel. Similarly, as the selected pixel moves down, the $MC_x$ and $MC_y$ vectors play a larger role in the value of the resultant vector. As can be appreciated, alternative multi-point formulas can be employed to determine the value.

Once each pixel has its own vector calculated in the above manner, the pixel's former x and y address is offset by the x and y component of this vector to determine its new address. For example, the pixel at coordinate 200, 400 with a resultant vector of (+6 2/8, +14 3/8) will point to the value at pixel 206 2/8, 414 3/8. Of course, there is no pixel at that exact location, but four pixels (206, 414), (207, 414), (206, 415) and (207, 415) surround that location, and a resultant value can be interpolated from the values at those surrounding coordinates.

Figure 7:
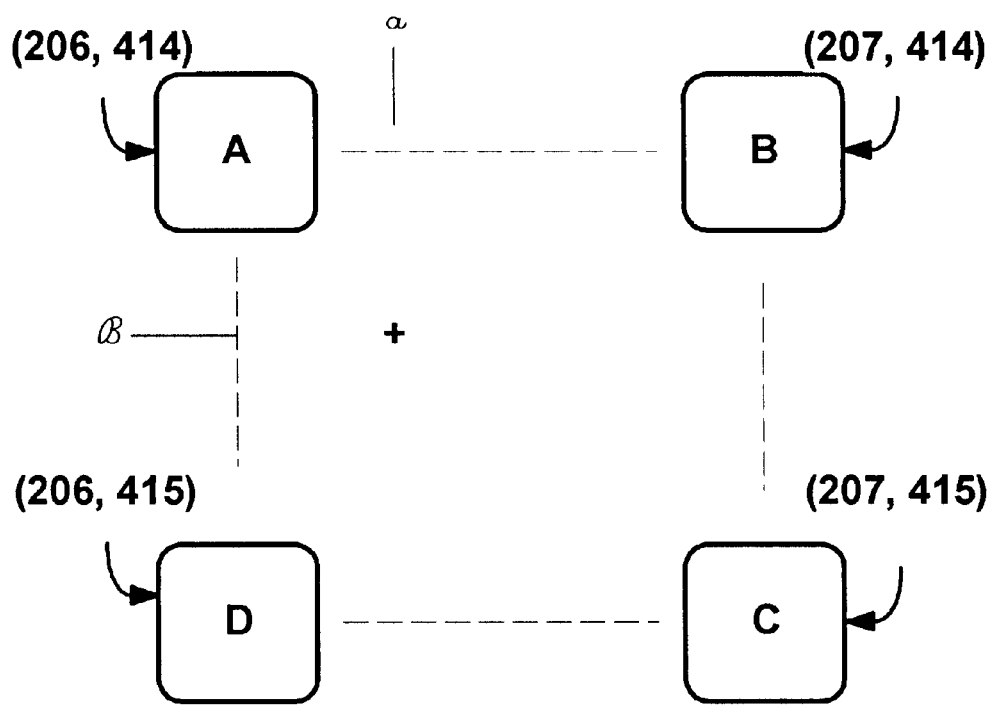
FIG. 7 is a representation of four pixels surrounding a location determined from an interpolation of vectors.

FIG. 7 represents the interpolated pixel location, indicated by the "+" (plus) sign. Using a second interpolation, an interpolated color value of the pixel at the in-between point (e.g., 206 2/8, 414 3/8) is determined. As shown in FIG. 7, assume that A, B, C and D are the values of the four pixels at coordinates (206, 414), (207, 414), (206, 415) and (207, 415). This value can be a single grayscale value, but ordinarily the interpolation is individually performed on the red, green and blue value in an RGB scheme to determine new red, green and blue levels. A preferred formula for determining the new value is $$\text{Color component} = (1-\beta)A + \beta(B-A) + \beta(C) + \alpha(D-C),$$

where $\alpha$ is the x fractional component equal to (2/8 or 1/4) and $\beta$ is the y fractional component equal to 3/8. This is a simple formula repeated on each of the color components R, G, or B (or performed once if a grayscale is used). As can be appreciated, multi-point formulas can alternatively be employed to determine the value.

Similar to the previous bilinear interpolation, this interpolation weighs the new color values (or greyscale value) based on the proximity to each surrounding pixel. Once determined, this value becomes the value of the pixel at the current location in the block, e.g., at coordinate 200, 400. The new frame blocks are stored in the decoder memory 54, shown in FIG. 4 at location 62.

Once the pixels in the block have their values motion compensated in this manner, the block can further undergo error correction. For example, the inverse of the transform (such as the Lapped Orthogonal Transform) results in a matrix of error correction values, shown stored in the memory at location 64. These values, obtained at the encoder from the pixel differences between the encoded block and actual block data, are added back to each of the pixel values by a sum circuit (e.g., built into the processor 58), whereby the block is ready for display.

Because the predictions no longer have sharp artificial edges when using the above-described bilinear motion compensation, the edges between blocks are smoothed. For example, a zoom motion in MPEG-2, centered on a block, has a zero motion vector even though the block has enlarged. Despite the motion, all that MPEG-2 can use is the original block data, which has not changed. More correction data has to be sent to correct the image, and even then sharp edges are visible. Conversely, with the present invention, the center pixel will not move with a zoom, but the other pixels will have their offsets adjusted to reflect the motion of the zoom.

As can be appreciated, bilinear motion compensation provides significant advantages over MPEG-2 motion compensation in all types of movement other than simple translational movement. Note that the compensation is the same for simple translational movement, as the vectors all point the same direction. With slightly more decoding processing, the same number of vectors, typically with less error correction data, provides superior image reconstruction.

However, a few additional considerations need to be addressed with bilinear motion compensation. In particular, the end blocks do not have four vectors. Nevertheless, the end blocks can use the vectors they do have, whereby corner blocks will effectively use a single vector, MPEG-2 motion compensation, while end blocks not in corners can use two vectors for motion compensation. This is not believed to be significant, since at worst the compensation is that of the MPEG-2 scheme in a few, ordinarily overscanned locations that do not necessarily appear on the display screen.

One other problem that occurs is when an adjacent block corresponds to a sharp contrast on the screen and thus has vectors which overwhelm the vector components of the current block. Such adjacent vectors, which can, for example, be negative relative to the vector of the current block, can actually invert the pixels in a block. As such, the encoder needs to detect such instances, and notify the decoder of the problem. This may be accomplished by setting a bit accompanying the vector data and correction data sent for a given block, the bit value instructing the decoder to use the single-vector, MPEG-2 scheme for blocks whenever this condition is detected.

As can be seen from the foregoing detailed description, there is provided a method and mechanism for improving the transmission and reconstruction of compressed video images. The method and system function in a layered compression architecture to substantially reduce the perceived edge boundaries between blocks of pixels in a reconstructed image. The method and system do not increase the amount of motion vector data transmitted and oftentimes reduce the amount of error correction data transmitted.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer-readable medium having computer-executable instructions, comprising:
   storing information corresponding to at least one other frame of pixels, the pixels organized into distinct sets;
   storing received motion information, the motion information comprising vectors associated with at least some of the sets of pixels; and
   constructing a new frame based on the at least one other frame of pixels and the motion information by selecting at least some of the pixel positions in the new frame, interpolating at least two of the vectors relative to each selected pixel position in the new frame to determine a location in the other frame, and setting a pixel value for the selected pixel position in the new frame based on the location determined in the other frame.

2. The computer-readable medium having computer-executable instructions of claim 1 wherein each of the distinct sets of pixels comprise rectangular blocks.

3. The computer-readable medium having computer-executable instructions of claim 2 wherein at least some of the rectangular blocks are equivalent in size to other rectangular blocks.

4. The computer-readable medium having computer-executable instructions of claim 2 wherein at least some of the rectangular blocks are equivalent in dimensions to other rectangular blocks.

5. The computer-readable medium having computer-executable instructions of claim 1 wherein at least some of the distinct sets of pixels are equivalent in size to other distinct sets.

6. The computer-readable medium having computer-executable instructions of claim 1 wherein at least some of the distinct sets of pixels are equivalent in shape to other distinct sets.

7. A method for constructing a second video image from a first video image, comprising:
   maintaining the information corresponding to the first video image;
   selecting a selected pixel in the second video image;
   mathematically combining at least two distinct sets of motion information to determine a location relative to at least two of the pixels in the first video image, each distinct set of motion information having a distinct relationship with the selected pixel; and
   constructing the second video image including setting a pixel value for the selected pixel based on the location determined in the first video image, such that the value set for the selected pixel in the second video image provides the appearance of motion relative to the first video image.

8. The method of claim 7 wherein mathematically combining at least two sets of motion information comprises interpolating the at least two sets.

9. The method of claim 7 wherein each set of motion information comprises a motion vector.

10. The method of claim 7 wherein the information corresponding to a first set of pixels is organized in a block.

11. The method of claim 7 wherein each relationship with the selected pixel includes a proximity relative to the selected pixel.

12. A computer-readable medium having computer-executable instructions for performing the method of claim 7.

13. A method for constructing a video image, comprising:

maintaining information representative of at least part of a first frame of video information;

receiving a plurality of data sets, each data set representing a distinct set of motion information;

selecting selected pixels in the video image to be constructed, and for each pixel selected, mathematically combining at least two of the data sets to obtain combined motion information for the selected pixel, each data set that is combined for the selected pixel having a distinct relationship with the selected pixel; and constructing a second frame of video information with the selected pixels by setting values therefor determined via the combined motion information and locations found thereby in the first frame of video information such that the values set for the selected pixels in the video image that is constructed provide the appearance of motion relative to the first frame of video information.

14. The method of claim 13 wherein each data set comprises a motion vector.

15. The method of claim 13 wherein mathematically combining at least two of the data sets comprises interpolating the at least two data sets.

16. The method of claim 13 wherein constructing a second frame of video information comprises, determining a pixel value in the second frame based on at least one pixel value in the first frame and the combined motion information.

17. The method of claim 13 wherein each data set comprises a motion vector.

18. The method of claim 13 wherein mathematically combining at least two of the data sets comprises interpolating the data sets.

19. The method of claim 13 wherein the first frame of video information is arranged into sets of pixels.

20. The method of claim 19 wherein each set of pixels comprises a rectangular block.

21. The method of claim 13 wherein each relationship with the selected pixel includes a proximity relative to the selected pixel.

22. A computer-readable medium having computer-executable instructions for performing the method of claim 13.

* * * * *

UNITED STATES PATENT AND TRADEMARK OFFICE
CERTIFICATE OF CORRECTION

PATENT NO. : 6,307,887 B1
DATED : October 23, 2001
INVENTOR(S) : Gabriel

It is certified that error appears in the above-identified patent and that said Letters Patent is hereby corrected as shown below:

Column 1,
Lines 9-10, "1999, now abandon which" should read -- 1999, now abandoned which --.

Column 2,
Line 2, "transslational" should read -- translational --.
Line 37, "Transformation" should read -- transformation --.
Line 38, "or" should read -- of --.

Column 3,
Line 3, "notion" should read -- motion --.
Line 10, "f" should read -- of --.
Line 62, "Incorporated" should read -- incorporated --.

Column 4,
Line 5, "e.q," should read -- e.g., --.
Line 30, "FIG." should read -- FIGS. --.
Line 50, "decoder uses" should read -- decoder, uses --.

Column 5,
Line 5, "The" should read -- the --.

Column 6,
Line 34, "(e.g., 0-15, 0-15 divided" should read -- (e.g., 0-15, 0-15) divided --.
Line 41, "vector x-component" should read -- x vector component --.

Column 7,
Line 4, "β(B-A)" should read -- α(B-A) --.

Signed and Sealed this

Fourth Day of January, 2005

JON W. DUDAS
*Director of the United States Patent and Trademark Office*